UNITED STATES PATENT OFFICE.

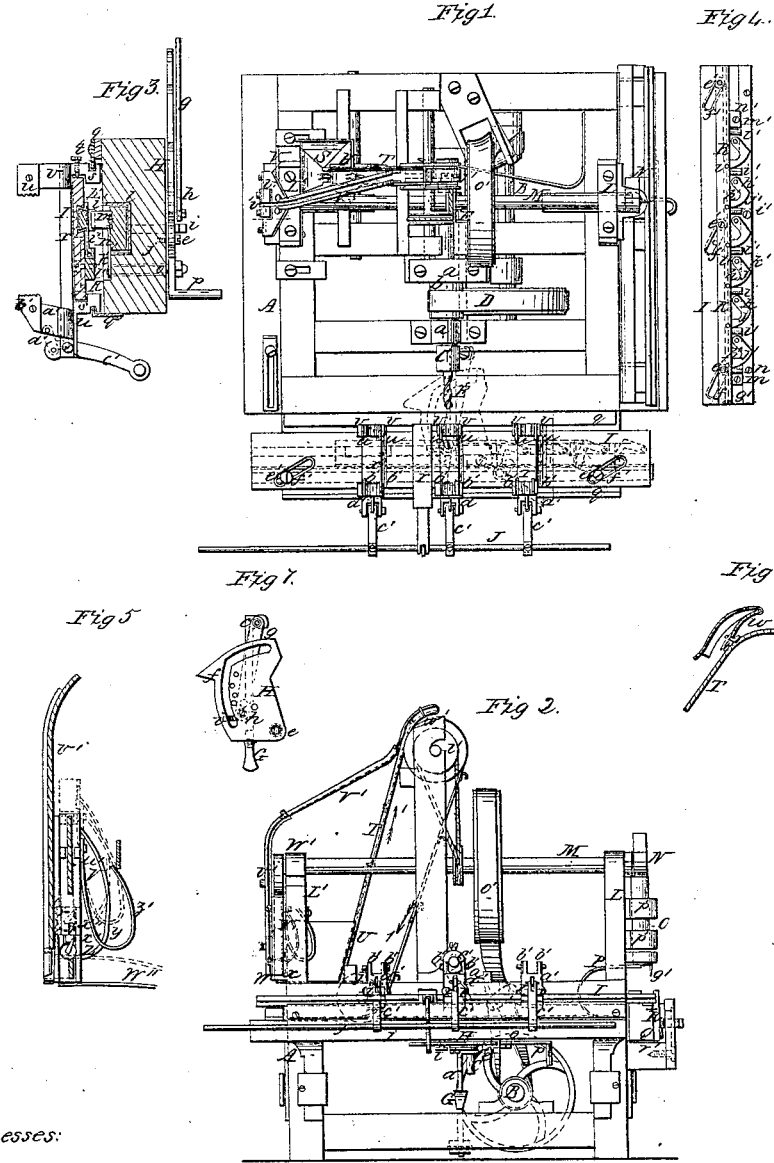
Johnson & Doyle,
Making Window Blinds.
N° 29,380. Patented July 31, 1860.

W. F. JOHNSON AND J. DOYLE, OF WETUMPKA, ALABAMA.

BLIND-SLAT MACHINE.

Specification of Letters Patent No. 29,380, dated July 31, 1860.

*To all whom it may concern:*

Be it known that we, W. F. JOHNSON and J. DOYLE, of Wetumpka, in the county of Coosa and State of Alabama, have invented a new and Improved Machine for Making Window-Blinds; and we do hereby declare that the following is a full, clear, and exact description of the same, reference being had to the annexed drawings, making a part of this specification, in which—

Figure 1, is a plan or top view of our invention. Fig. 2 an elevation of the same. Fig. 3 a section of a portion of the same taken in the line $x$, $x$, Fig. 1. Fig. 4 an inverted plan of one of the sliding beds of the same. Fig. 5 is a vertical section of the staple-driving device of the same. Fig. 6 is an enlarged section of the staple stripper. Fig. 7, is an inverted plan of a part of the mechanism by which the stile is adjusted while being used.

Similar characters of reference indicate corresponding parts in the several figures.

This invention relates to certain mechanism employed for "laying off" and boring the stiles for the purpose of framing them to their rails and also for boring the stiles to receive the tenons of the slats. The invention further relates to certain means employed for pricking the blind rods and a novel mechanism for driving the staples in the rods.

The object of the invention is to obtain a machine which will greatly expedite the manufacture of window blinds and perform the work not only very expeditiously but in a perfect manner.

The invention consists firstly, in the employment or use of adjustable-tooth racks so constructed that the stiles and rods of the blind may be moved automatically and spaced at intervals of greater or less length as may be required to receive the slats and staples.

The invention consists secondly, in a novel arrangement of a treadle, cam and auger-arbor, in connection with an adjustable-tooth rack for the purpose of spacing and boring the stiles of the blinds automatically.

The invention consists thirdly, in the employment or use of an endless belt provided with hooks and working through a hopper, in connection with a stripper or staple-discharging device placed at the upper part of the belt for the purpose of conveying the staples from the hopper to the staple-driving device.

The invention consists fourthly in a staple-driving mechanism, consisting of a hammer working in the lower part of a staple guide and so arranged as to drive the staples into the rods as the former are fed to the hammer.

To enable those skilled in the art to fully understand and construct our invention we will proceed to describe it.

A represents a framing which may be constructed in any proper way to support the working parts.

B, is the power or driving shaft which is placed in the lower part of the framing A, and from which an auger-arbor C, is driven by a belt D, the arbor C, being fitted horizontally in suitable bearings $a$, on the framing. The pulley $b$, on the arbor C, is fitted to it by means of a feather and groove so as to admit of the arbor sliding through the pulley while the latter is allowed at the same time to rotate the former.

E is the auger fitter in the end of the arbor C.

F, is a sliding bar the back end of which is attached to the back end of the arbor C, the front end of the sliding bar being bent down in a vertical position as shown at $c$, and passing through the upper part of a lever $d$, at the back part of a treadle G.

H, is a plate which is, secured in the framing by a pivot $e$, and having a curved slot $f$, made through it as shown clearly by the dotted lines in Fig. 1. This plate H, is connected by a rod $g$, with the sliding bar F. the part $c$, of which passes through the back part of the rod $g$. The rod $g$, is attached to the plate H, by a bolt $h$ which is fitted in either of a series of holes in the plate so that the rod $g$, may be attached nearer to or farther from its axis or pivot $e$, in order to regulate the throw or movement of the plate as may be desired, see Fig. 7. In the curved slot $f$, of the plate H, a rod $i$, is fitted. This rod passes up through a beam $j$, of the framing to the under side of which beam the plate H, is attached and the upper end of rod $i$, is connected to a bar $k$, which is fitted in a recess $l$, in the upper surface of the beam. To the upper surface of the bar $k$, a spring or elastic bar $m$, is attached which spring or bar serves as a pawl, and $n$, is a button which is at the upper end of a rod o, that passes vertically through beam j, said button n, by the turning of rod o, passing on and depressing pawl m, rendering the latter inoperative when required. The lower end of rod o, is provided with a crank or handle p, for the convenience of turning the button n.

I is a metal plate which is fitted between guides q, q, on the upper surface of the beam j, of the framing and allowed to move longitudinally thereon. On this plate I, there are placed transversely metal bars r, three bars r, are shown in Figs. 1 and 2, but more may be used if required. These bars r, are allowed to slide on the plate I, they being attached to guides s, which are fitted to the edges of the plate as shown clearly in Fig. 3. The bars r, are secured at any desired point on the plate I, by means of set screws t. To the inner end of each bar r, there are two serrated jaws u, u. These jaws u, u, are attached to uprights v, v, which are secured to the guides s, at the inner edge of plate I. The outer sides of the guides s, are grooved and receive the guides q, q, of the beam j. The jaws u, u, are stationary but on the outer parts of the bars r, there are fitted slides w, w, having each two uprights a', a', to which jaws b', b', are attached. The slides w, w, are moved or adjusted on the bars r, by means of levers c', which are attached to the outer ends of the bars r, and connected to the slides w, by links d'. The lower ends of the levers c', are attached to a rod J, by moving which all the levers c', are actuated simultaneously and consequently the slides w, w, the rod J, an slides w, w, being secured at any desired point within the scope of their movement by means of a rack d', or an equivalent device.

To the under side of the plate I, there is attached longitudinally a bar K. This bar K, is attached to the plate I, by screws e', which pass through oblique slots f', in the plate as shown clearly in Figs. 1 and 4. The under side of the plate I, is grooved longitudinally as shown at g', said groove and the bar K, being parallel with each other as shown clearly in Fig. 4. In the groove g', of the plate I, there are placed a series of bars h', having each a tooth i', attached, said teeth projecting down from the plate and forming a rack as shown clearly in Fig. 4. To each bar h', an eccentric segment j', is attached by a pivot k', and the end of each eccentric is connected to the bar K, as shown at l', Figs. 3, and 4. In the groove g', bars m', are fitted and secured at the desired points by screws n'.

The parts above described constitute the boring device and in order to prevent confusion we will describe its operation separately.

The stile to be operated upon is placed on the plate I, and secured thereon in proper position by raising the rod J, and thereby forcing the jaws b', b', inward the stile being secured between the jaws b', and u. The bars r, previous to the securing of the stile on the plate I, are adjusted on the plate so as to correspond in position to the mortises to be made in the stile, and consequently when the stile is secured to the plate the points are designated where the mortises are to be made. The shaft B, is rotated by any convenient power and motion is communicated to the arbor C, by the belt D, as previously described. The stile is bored by depressing the treadle G, the lever d, actuating the sliding bar F, and the latter the arbor C. The plate I, is moved along on the beam j, by the operator as but few mortises are required, three being generally made in the stiles, as but three rails are employed for ordinary sized blinds. In order that the plate I, may be easily moved on beam j, the pawl m, is depressed by the button n. When the holes for the rail mortises are made or bored the plate I, is moved so that the stile will be placed in proper position to be bored to receive the tenons of the slats. When the stile is thus adjusted the pawl m, is freed from the button n, the latter being turned off from it, and the pawl m, is allowed to engage with the teeth i'. Each time the treadle G, is depressed and simultaneously with the forward movement of the auger E, the plate I, is moved the distance of the space between the teeth i', the pawl m, engaging with a tooth i', and thereby moving the plate and stile attached to it. The pawl m, is moved through the medium of the plate H, rod i, and bar K, and the slot f, of plate H, is so curved that the movement of the pawl m, will cease as the auger reaches the stile, the pawl remaining inoperative, and the stile being consequently stationary, while the auger enters the stile and performs its work. The distance between the auger holes may be varied as occasion may require by adjusting the bar K, the latter when moved actuating the eccentric segments j, and consequently admitting of the teeth i', being nearer together or farther apart as desired. When the teeth i', are adjusted the bars m', are secured in the groove g', and snugly against the teeth i', which adjoin them thereby keeping all the teeth i', in proper position when adjusted. These adjustable tooth racks therefore it will be seen are an important feature of the invention.

On the framing A, there are placed two uprights L, L', one at each side. The upper ends of these uprights form bearings for a shaft M, which is driven by a belt o', from the shaft B. On one end of the shaft M, a cam N, is placed, and this cam acts on an arbor O, which is fitted in bearings p', on the uprights L, and has its lower end resting on a spring P. In the lower end of the arbor O, two awls $g'$, are fitted, which awls punch the staple-holes in the blind rods.

To the framing A, at the same side the upright L, is attached, there is secured a beam $r'$, which forms a bed for a plate Q, which has an adjustable tooth rack R, precisely the same as the one attached to the plate I, and which therefore need not be described. The blind rod to be pricked is placed on a bar connected with plate Q, and is fed along so as to be pricked at equal distances apart to receive the staples, the cam N, forces down the arbor O, and driving the awls into the rod and the spring P, forcing the arbor upward as the prominent portion of the cam leaves it.

At the side of the framing A, adjoining the upright L', there is placed a hopper S, in which the staples that are to be driven in the rods are placed. T, is an endless belt which is slightly inclined and works over pulleys $s'$, in the framing. The belt T, is provided with hooks $t'$, at equal distances apart. The belt T, passes upward within the hopper S, at one side within a guide spout U, and at the upper end of this spout there is a curved slotted plate $w'$, which serves as a stripper to discharge or strip the staples from the hooks of the belt T. To the outer side of the upright L', there is attached a box V, to the outer or face side of which guides $v'$, are attached, said guides forming a spout to convey the staples to the driver W. This driver W, is a pin which projects through a slot at the lower part of the spout formed by the guides $v'$, said pin or driver being attached to a bar X, which is fitted within the box V, between guides $w^x$. Transversely in the bar X, there is placed a small cylinder $z$, which has an arm $x'$, at each end. To this cylinder $z$, a spring $y$, is attached, said spring being curved upward and fitted in the upper part of the box V. The bar X, also has a spring $z'$, attached to it which spring has a tendency to keep the bar in contact with the front plate of the box V.

These parts above described constitute the staple driving device, and the operation of it is as follows: The shaft of the upper pulley $s'$, of the belt T, is driven by a belt from the shaft M, the belt moving in the direction indicated by the arrows 1. The hooks $t'$, each carry up a staple shown in red and as the hook commences to pass over the upper pulley $s'$, the curved slotted plate $u'$, strips the staples from the hooks as shown clearly in Fig. 6 and the staples pass down in the inclined spout U', into the space formed by the guides $v'$, and pass down on the top of the driver W. This driver W, is forced down by the action of a cam W', on the shaft M, which cam acts on the top of the bar X, the lower end of said bar resting on a spring W'', which forces upward the bar X, and driver when the bar is relieved from the prominent portions of cam W'. The staples are driven into the blind rod by the descent of the driver and each time the driver ascends the bar X, is drawn inward and consequently the driver W, by means of the arms $x'$, at the ends of the cylinder $z$, which as the bar X rises pass behind the stationary projections $x''$, and consequently draw back the bar X, and its driver, and permit of a staple passing down below the driver. The spring $y'$, allows the arms $x'$, of the cylinder $z$, to turn a little while passing down in front of the projections $x''$, the spring $z'$, forcing the bar forward as the arms $x'$, pass above the projections $x''$. Thus it will be seen that at each descent of the driver a staple is beneath it ready to be driven into the rod by the driver.

Having thus described our invention what we claim as new and desire to secure by Letters Patent, is:

1. The adjustable tooth-rack R, constructed substantially as shown to wit; the teeth $i'$, being fitted loosely in a grooved plate I, and adjusted through the medium of the eccentric segments $j'$, bar K, and bars $m'$, or their equivalents for the purpose of varying the length of the spaces between the mortises or holes of the slides as set forth.

2. The combination of the adjustable tooth rack R, and the auger-arbor C, when operated simultaneously through the medium of the sliding bar F, slotted plate H, pawl $m$, and treadle G, arranged substantially as and for the purpose set forth.

3. The reciprocating arbor O, provided with awl $q'$, in connection with an adjustable-tooth rack R, for the purpose specified.

4. The endless belt T, arranged relatively with a hopper S, and provided with hooks $t'$, in connection with the curved stripping plate $w'$, for the purpose of taking the staples from the hopper and feeding them to the staple driver W, as described.

5. The arrangement of the bar X, to which the driver W, is attached cylinder $z$, provided with arms $x'$, the stationary projections $x''$, in the box V, together with the springs $y'$, $z'$, to give the lateral motion to the driver to admit of the staples passing below it to be driven as set forth.

W. F. JOHNSON.
J. DOYLE.

Witnesses:
A. BURROWS,
R. GREENE.